United States Patent [19]

Burt

[11] 4,384,186
[45] May 17, 1983

[54] ELECTRODE SEALING SYSTEM FOR THERMOPLASTIC TUBE

[75] Inventor: Rodney T. Burt, Tucson, Ariz.

[73] Assignee: William R. Burt, Scottsdale, Ariz.

[21] Appl. No.: 285,996

[22] Filed: Jul. 23, 1981

[51] Int. Cl.³ .......................... H05B 6/54; B32B 19/02
[52] U.S. Cl. .............................. 219/10.81; 219/10.53;
 219/10.77; 219/10.67; 156/274.4; 156/380.6
[58] Field of Search ............... 219/10.53, 10.81, 10.73,
 219/10.75, 10.77, 518, 227; 156/274.4, 274.6,
 380.2, 380.3, 380.4, 380.5, 380.6, 380.7, 380.8,
 381, 358, 359

[56] References Cited

U.S. PATENT DOCUMENTS

| | | | |
|---|---|---|---|
| 2,820,875 | 1/1958 | Werych et al. | 219/10.81 X |
| 3,281,566 | 10/1966 | Zelnick | 219/10.53 |
| 4,013,860 | 3/1977 | Hosterman et al. | 219/10.81 |
| 4,186,292 | 1/1980 | Acker | 219/10.81 |

Primary Examiner—C. C. Shaw
Assistant Examiner—Philip H. Leung
Attorney, Agent, or Firm—Harry M. Weiss

[57] ABSTRACT

A system for hermetically sealing a thermoplastic tube during each cycle of operation of the system. A hand-holdable sealing gun has a pair of electrodes between which a tube to be sealed is placed. One of the electrodes is fixed and the other is moved by the core of a solenoid on which the moveable electrode is mounted. An RF field is established between the two electrodes to heat the tube between them. A limit switch is closed to terminate the RF field when the distance between the electrodes reaches a predetermined minimum distance. A trigger switch on the gun when squeezed initiates a cycle of operation of the system. A power supply, a source of RF energy, a mode switch and a second trigger switch are mounted in or on a housing. A bracket is also mounted on the housing for the sealing gun. The bracket positions the gun so that it can be operated in a fixed position. A mode switch determines whether the system will operate with the sealing gun held being in the hand of an operator or in a fixed mode of operation with the gun mounted on a bracket on the housing. A single cable connects the sealing gun with the power supply, the RF source, DC power supply and selected control switches which are mounted on the housing.

17 Claims, 9 Drawing Figures

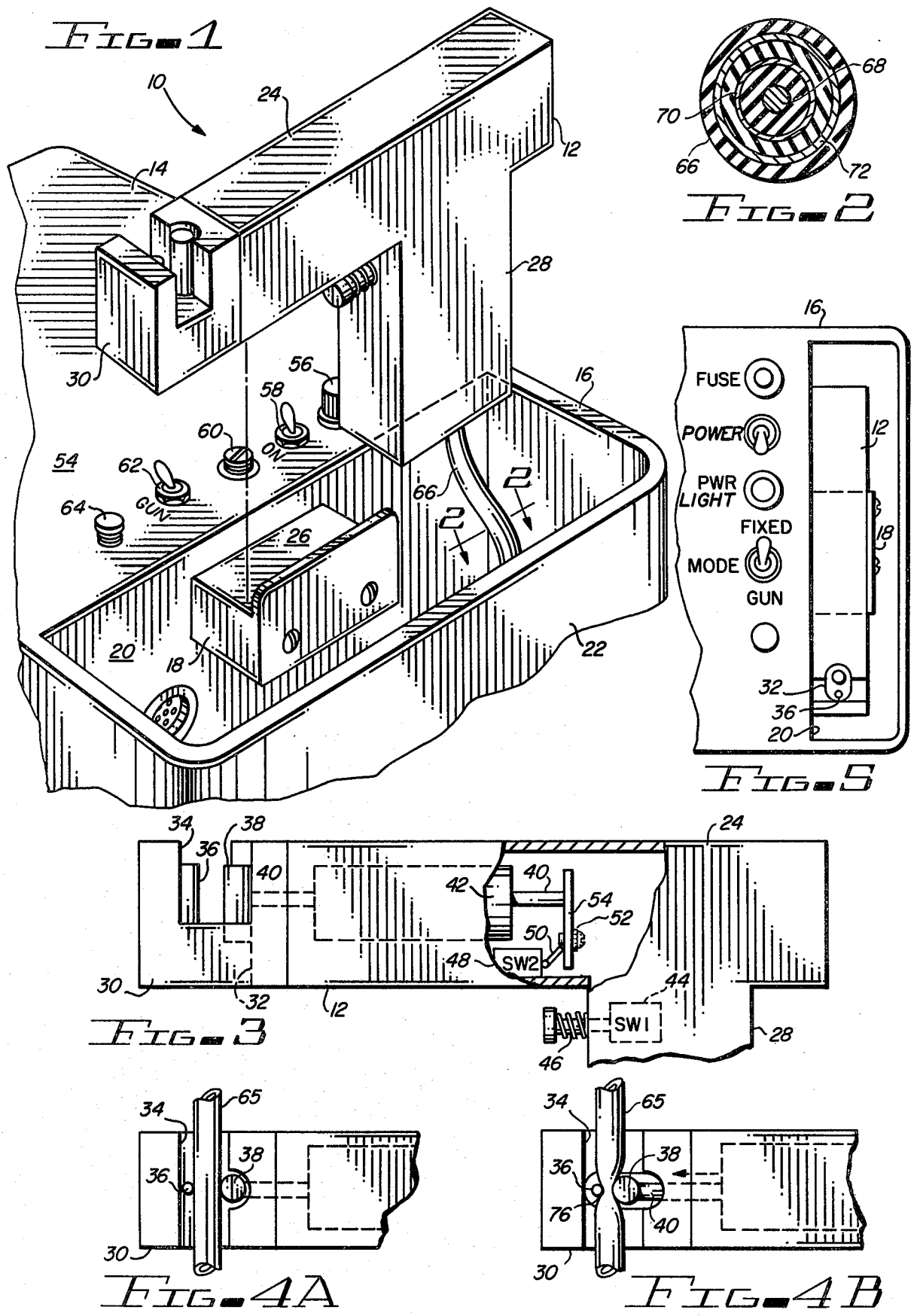

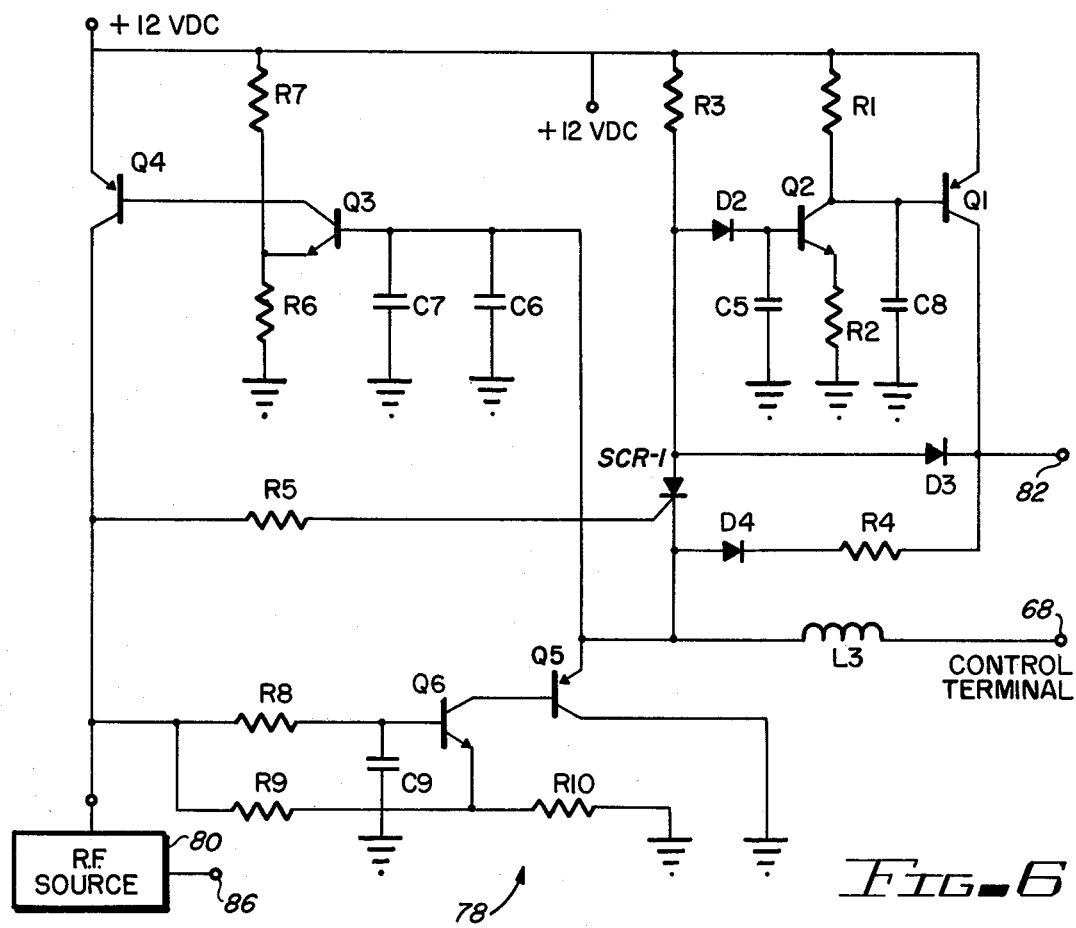
FIG-6
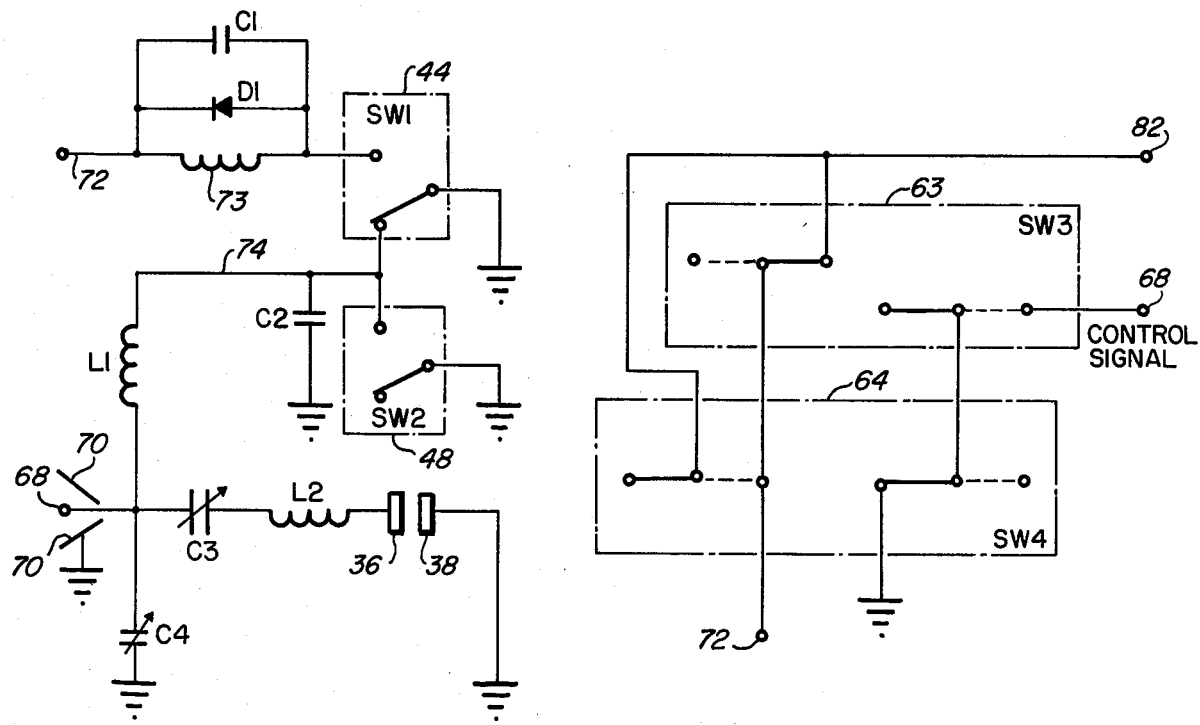
FIG-7
FIG-8

ELECTRODE SEALING SYSTEM FOR THERMOPLASTIC TUBE

BACKGROUND OF THE INVENTION

1. Field of the Invention

The present invention relates to a system for hermetically sealing a thermoplastic tube containing a liquid, which system has two modes of operation; one in which the tube sealing portion of the system is hand-held and the second in which the tube sealing portion is mounted in a fixed position.

2. Description of the Prior Art

The need to collect blood from donors is ongoing and occurs wherever modern medicine is practiced, particularly in the larger urban centers. As a result, blood collection centers have been established at fixed, or permanent, locations. In addition, mobile blood collection units are employed to serve remote areas or to obtain blood from donors at locations where large numbers of potential donors are to be found such as shopping centers, factories, office buildings and the like.

The process of collecting blood from the donor is relatively straightforward from the donor's perspective, but the means for storing, preserving, and classifying the blood collected requires sophisticated techniques and equipment to minimize the loss of blood and to minimize the risk of contaminating collected blood while still making it possible to obtain samples of collected blood, plasma and the like materials derived from human blood under the most hygienic conditions.

Typically a predetermined amount of blood is collected from a donor within a collector bag by means of tubing connected to a needle through which blood from a donor is drawn. It is preferable to be able to seal the collection tube in close proximity to the needle in order to maintain sterility of the collected blood, or at least to prevent contamination from sources outside of the donor prior to withdrawal of the needle from the donor's arm. Under such circumstances the maximum usable amount of blood is obtained with the highest probability of maintaining it free from external contaminating influences. To facilitate classifying and testing blood once collected as well as the separated components of blood when processed, the collection tube, or equivalent, may be sealed to provide several compartments, or segments, with each containing sufficient amounts of the fluid so that tests can be made for example to classify the contents of the fluid in a collection bag while maintaining the fluid in the bag sterile, by not subjecting it to external sources of contamination.

There is a need for a tube sealer system to hermetically seal tubes which are made of a thermoplastic material such as polyvinylchloride (PVC) at the collector sites where donors give blood as well as at the processing centers where blood is typed and processed into various components, for example. At collector sites a hand-held sealer is needed to bring the sealer to the tube to be sealed while the tube is still connected to the needle in the donor's arm. At processing centers, it is frequently more convenient to bring the tubing to be sealed to a sealer which is in a fixed position.

Prior art tube sealing systems have provided either for a hand-held sealer, or a fixed substantially immoveable sealer. As a result, no one sealer system is capable of performing all of the tube sealing functions associated with the collection, processing, and using of blood and blood derivatives as required by modern health service systems.

Prior art tube sealing systems have also had a problem with "burn through" which occurs when the thermoplastic material of the tubing is either overheated by the dielectric heating process using an RF field between a pair of electrodes, or the electrodes squeeze the walls of the tube so that too little material of the walls of the tubing remain, with the result that the tube on either side of the electrodes is not properly sealed. As a result, the liquids in the tubes can escape and the contents are subject to external contamination, and thus are no longer sterile.

Prior art tube sealing systems have attempted to prevent burn through by controlling the amount of RF power used to heat the dielectric material from which the tubes are made. Such tube sealing systems have done so by controlling the amount of RF power applied to heat the tubing and the time that the RF power is applied to the electrodes between which the tubing is located. Such systems are not particularly satisfactory in controlling the amount of heating of the material of the tubing and thus increase the risk of burn through because of the many other variables that affect the amount of heat induced in the dielectric material which includes the material itself, the liquids in the tubing, etc. Thus better means for controlling the sealing process are needed other than by attempting to control or vary the magnitude of the RF power supplied, or the time that the RF power is supplied, or both.

PRIOR ART STATEMENT

The following references are submitted under the provisions of 37 CFR 1.97 (b).

U.S. Pat. No. 4,013,860 Hosterman et al
U.S. Pat. No. 4,186,292 Acker

Hosterman et al, U.S. Pat. No. 4,013,860 discloses a hand-held tube sealer that compresses and welds tubing intermediate a pair of jaws with the jaws serving as plates of a variable capacitor RF resonant circuit. Hosterman et al uses a flexible handle 3 to apply force to moveable jaw 6 toward fixed jaw 5. Tip 23 on handle 3, when it engages plunger 24 of switch 25 opens switch 25 which actuates transmitter TX to supply energy to sealer 1.

Acker, U.S. Pat. No. 4,186,292 teaches a desk-mounted sealer. A source of RF heat seals plastic tubing placed between a fixed jaw and a moveable jaw. A solenoid is used to power the moveable jaw.

SUMMARY OF THE INVENTION

The present invention provides a sealing system for sealing a tube made of a thermoplastic material containing a fluid such as whole blood. The system has a cycle of operation during each of which a tube if placed between a pair of electrodes is sealed. The tube sealing portion, or sealing gun, of the system is designed to be held in one hand by an operator. One of the sealing electrodes of the sealing gun is fixed, and the other is mounted for movement relative to the fixed electrode on the moveable core of a solenoid mounted in the sealing gun. A circuit is provided to establish an RF field between the electrodes to heat by dielectric heating a tube of thermoplastic material placed between them. When a predetermined minimum distance between the electrodes exists, the supply of RF energy to the electrodes is stopped. A first initiating switch which has two conditions, a standby condition and a cycle-initiating condition is mounted on the handle of the tube sealing gun so that the initiating switch can be placed in its cycle-initiating condition by pressure of a finger of the hand holding the gun. A system housing is provided which includes a power supply and a source of RF energy. The housing also has a bracket for receiving and holding the tube sealing gun in a fixed position relative to the housing. The gun is positioned on the housing so that a tube to be sealed can be easily placed between the two electrodes. A flexible electrical cable interconnects the power supply and the source of RF energy to the sealing gun. Necessary control signals are also transmitted through the cable. Control circuits, which include a mode control switch, which in one condition permits a cycle initiating switch of the sealing gun to initiate a cycle of operation of the system when the sealing gun is hand-held, and when in its other condition permits a second cycle initiating switch to initiate a cycle of operation when the gun is mounted on the housing bracket. The control circuits energize the solenoid for a first predetermined period of time. After that first period of time has passed RF energy is applied across the two electrodes to heat the thermoplastic tubing there between. When the moveable electrode has moved toward the fixed electrode a distance such that a predetermined minimum distance, corresponding the desired thickness of a seal, is reached, RF energy is no longer applied across the two electrodes to heat the tubing. A short period of time after the RF energy is stopped, the solenoid is deenergized and the moveable electrode moves away from the fixed electrode, the sealed tubing can be removed from between the electrodes and the system is ready for another cycle of operation to be initiated.

It is an object of this invention to provide a system for sealing a tube of the thermoplastic material in which the sealing gun can be either hand-held or can be mounted in a fixed position.

It is another object of this invention to provide a sealing system for a tube of thermoplastic material in which the supply of RF energy to heat the tubing is initiated after the electrodes have been forced towards each other for a predetermined period of time.

It is yet another object of this invention to provide a sealing system in which the system terminates the application of RF energy across the electrodes squeezing the sides of the tubes together when the electrodes are a predetermined minimum distance apart.

It is still another object of this invention to provide a sealing system for sealing tubes made of a thermoplastic material containing a liquid in which the risk of burn through is minimized.

BRIEF DESCRIPTION OF THE DRAWINGS

Other objects, features and advantages of the invention will be readily apparent from the following description of the preferred embodiment thereof taken in conjunction with the accompanying drawings, although variations of modifications may be effected without parting from the spirit and scope of the novel concepts of the disclosure and in which:

FIG. 1 is a perspective view of the sealing system of the invention with the sealing gun exploded from the system housing.

FIG. 2 is a section taken on line 2—2 through the flexible electrical cable connecting the sealing gun with the system housing.

FIG. 3 is a side elevation with parts broken away of the sealing gun.

FIG. 4A is a plan view of the sealing gun, on an exaggerated scale, illustrating the position of the electrodes of the sealing gun relative to a piece of plastic tubing as the electrodes first contact opposite sides of tube to be sealed.

FIG. 4B is a view similar to FIG. 4A except that it illustrates the position of the electrodes of the sealing gun at the completion of the heating step of a cycle of operation.

FIG. 5 is a top plan view of part of the system's housing with the sealing gun in fixed position on the housing.

FIG. 6 is a schematic wiring diagram of the timing circuit of the control circuit of the system.

FIG. 7 is a schematic wiring diagram of the electrical elements of the sealing gun and FIG. 8 is a schematic wiring diagram of the system control switches which are mounted on the system housing.

DESCRIPTION OF THE PREFERRED EMBODIMENT

In FIG. 1 tube sealing system 10 is provided with a sealing gun 12, the tube sealing portion, or subsystem, of system 10 and a housing subsystem, or system housing, 14. In FIG. 1 housing 14 is illustrated as being positioned in a container, or carrying case, 16 so that sealing system 10 can be readily moved from one location to another as needed.

A mounting bracket 18 is mounted on side wall 20 of housing 14 in a space between end wall 22 of container 16 and side wall 20. Sealing gun 12 is adapted to be positioned on bracket 18 with body portion 24 of gun 12 resting on top surface 26 of bracket 18 and with handle 28 contacting one end of bracket 18. Body 24 and handle 28 of sealing gun 12 are preferably made of a good electrical conductor to substantially confine RF radiation from the RF circuits in body 24 and handle 28 to the interior thereof. Bracket 18 releasably holds gun 12 in a fixed position relative to housing 14, as is best illustrated in FIG. 5.

Nose 30 of body, or barrel, 24 of gun 12 is made of a suitable plastic material that can be repetitively cleaned and sterilized. Nose 30 can be molded, or machined, to provide vertical passage 32 and horizontal opening 34 through nose 30. Fixed electrode, or post, 36 is mounted in nose 30 as is moveable electrode 38. Moveable electrode 38 is mounted on moveable core 40 of a conventional solenoid 42 which is mounted in body portion 24 of sealing gun 12. The energization of the coil of solenoid 42 causes moveable electrode 38 to move toward fixed electrode 36. De-energization permits a conventional spring, which is not illustrated, to return core 40 to its initial position as illustrated in FIG. 3. Cycle initiating, or trigger, switch 44 is mounted in handle 28 of gun 12 and spring biased plunger 46 is positioned so that it can be depressed by pressure from a finger of the hand of an operator holding sealing gun 12 while the operator's hand grips or encircles handle 28. Limit switch 48 is positioned in barrel 24 so that its lever arm 50 is contacted by the end of lock screw 52 which is mounted on extension bracket 54. Bracket 54 is secured to and moves with core 40 of solenoid 42.

Housing 14 includes a conventional DC power supply that is not illustrated and which in the preferred embodiment supplies plus 12 volts DC. Housing 14 also includes a crystal controlled solid state RF oscillator and amplifier 80 that produces from 25 to 35 watts of RF power at a frequency of 27.125 MHz. Since the DC power supply and RF source 80 are conventional details of the circuits of source 80 are not illustrated. Mounted on top surface 54 of housing 14 are a replaceable fuse 56, an AC on-off switch 58, and a power on warning light 60 which lights when conventional AC power at 120-240 volts AC at 50 or 60 cycles is connected to the DC power supply circuit located in housing 14. Mode control switch 62 determines whether the sealing gun 12 is to be operated while hand-held by an operator, for example or is to be operated in a fixed position such as by being secured to bracket 18 as illustrated in FIG. 5. A second cycle initiating switch 64 is positioned on surface 54 so that when the system 10 is operating in its fixed mode with gun 12 positioned in bracket 18, as is best illustrated in FIG. 5, switch 64 can be closed to initiate a cycle of operation of sealer system 10 by tubing 65 being placed between electrodes 36 and 38. Tubing 65, when properly positioned, will depress switch 64 which initiates a sealing cycle of system 10.

Sealing gun 12 is connected to system housing 14 by a flexible electrical conductor cable 66 having 3 concentric conductors, a central conductor 68, an intermediate conductor 70 and an outer conductor 72. The conductors 68, 70 and 72 are insulated or separated by good electrical insulating material and the outer surface of cable 66 is also made of a good electrical insulating material. When gun 12 is mounted on bracket 18, cable 66 can be coiled up and placed in the space between walls 20 and 22. An AC power cord which is not illustrated, for connecting the power supply of system 10 to a commercially available 50 or 60 cycle AC power supply at 120-240 volts AC can also be stored in the space between housing 14 and wall 22 of carrying case 16 when system 10 is not in use.

Referring to FIG. 7 which is a schematic wiring diagram of sealing gun, 12, coil 73 of the solenoid 42 is in its standby position, with switch 44, SW-1 grounding the control line 74. Diode D1 and capacitor C1 are provided to suppress arcs which would otherwise occur when switch SW-1 either makes or opens a circuit through coil 73. Coil L1 allows DC control signals to flow to or reach control line 74 on the center conductor 68 of cable 66 which also carries the RF signal from the RF source of the system to fixed electrode 36. Capacitor C4, C3, and inductor L2 as well as the capacitance between electrodes 38 and 36 act as a matching pi network for the 50 ohm impedance of cable 66. By activating trigger switch 44, SW-1 the operator closes the circuit through coil 73 of solenoid 42 which energizes coil 73 by grounding one terminal of coil 73 so that DC current can flow through the outer conductor 72 of cable 66. Switch 48, SW-2 will be closed to ground control line 74 when the distance between the moveable electrode 38 and fixed electrode 36 has reached a predetermined minimum distance which produces seals 76 in tubing 65 that are easily snapped short if desired, while minimizing the possibility of a burn through.

In FIG. 6, plus 12 volts DC is supplied to the timing circuit 78 from the 12 volt DC power supply of the system which is located in housing 14 but which is not illustrated since it is conventional. When system 10 is in its standby condition, the circuit through coil 73 is open, and cycle-initiating switch 44 is in the position illustrated in FIG. 7. Control line 74 is grounded by cycle-initiating switch 44. As a result, current will flow through resistor R3 of FIG. 6 and charge capacitor C5 through diode D2. The voltage across capacitor C5 biases on transistor Q2. When transistor Q2 is turned on, it drives transistor Q1 into saturation. Resistors R7 and R6 form a voltage divider which sets a switch on bias voltage on the emitter of transistor Q3. When the user activates, or closes, trigger switch 44 of sealing gun 12, control line 74 is opened, and coil 73 of solenoid 42 is grounded which energizes solenoid 42 causing core 40 to move moveable electrode 38 toward the fixed electrode 36. Current flow through resistor R4 starts to charge capacitor C7 and when the voltage on C7 becomes sufficient, this voltage biases on transistor Q3. When Q3 is biased on, it turns on transistor Q4 which supplies DC power to RF source 80, illustrated in block form since it is conventional, which produces, or is the source of, RF power.

The power flowing through transistor Q4 triggers on the silicon control rectifier SCR-1. Resistors R9 and R10 form a voltage divider which set a switch on bias voltage for transistor Q6. Current through resistor R8 will charge capacitor C9. When the distance between the moveable electrode 38 and the fixed electrode 36 reaches the predetermined minimum or clamping distance, limit switch 48, SW-2 grounds control line 74. If the switch 48 does not ground control line 74 within a period of approximately 5 seconds, capacitor C9 on FIG. 6 will have charged to a sufficient potential to switch on transistor Q6, and transistor Q5 will be driven into saturation grounding control line 68 which is connected to conductor 74 through RF isolating coil L-1. Capacitor C7 is discharged and transistor Q3 and Q4 are cut off which terminates the power supply to RF source 80 thus stopping RF energy from RF source 80 from being applied across the electrodes 38 and 36. Current will now flow through R3 to ground through SCR-1 and the control lines 68 and 74. Capacitor C5 discharges through transistor Q2 and resistor R2 to the cut-off bias voltage created by resistor R1 and R2. Transistors Q2 and Q1 are cut off which creates approximately 2/10 of a second delay between RF power cut-off and the de-energizing of coil 73 of solenoid 42 which permits the moveable electrode 38 to move away from fixed electrode 36 to release tube 65. When solenoid 42 is de-energized, limit switch 48, SW-2 is opened, and transistor Q5 is cut off at approximately this time also. Current will now flow through resistor R3 and diode D3 and the solenoid to ground through switch 44 which cuts off SCR-1. The user deactivates trigger switch 44 of sealing gun 12 and which grounds control line 74 and opens the circuit through solenoid coil 73. Current through R3 now charges capacitor C5 and biases on Q2 driving Q1 into saturation. The sealing system is now in its standby condition ready to repeat a sealing cycle. Capacitor C8 eliminates unwanted oscillations from occuring as capacitor C5 discharges, and diode D4 blocks current from flowing through the SCR-1 and resistor R4 instead of diode D3. To minimize the impedance the transistor Q4, in the preferred embodiment Q4 is three transistors connected in parallel.

FIG. 8 illustrates the operation of mode switch 62, SW-3 and second cycle initiating switch 64, SW-4. When the mode control switch 62 is in the mode designated as gun control, or hand control, the moveable elements, or arms of the double-pull double-throw switch 62 are in the positions illustrated by solid lines in FIG. 8. In this mode the positions of the moveable arms of switch 44, SW-4 have no impact on the operation of the circuit. When mode switch 62 is in its fixed mode, its moveable arms are in the positions illustrated by the dotted lines in FIG. 8, so that the positions of the moveable elements of the double-pull double-throw switch 64 control the initiation of a cycle of operation in exactly the same manner as switch 44 on sealing gun 12. When the gun 12 is mounted on bracket 18, its cycle-initiating switch 44 grounds coil 73. To control current flow through coil 73 during the fixed mode of operation of system 10, switch 64 is connected between solenoid power terminal 82 of circuit 78 and coil 73.

In operation, when initiating switch 44 of sealing gun 12 is activated by a user, first, solenoid 42 is energized to clamp a piece of PVC tubing between fixed electrode 36 and the moveable electrode 38. Fixed electrode 36 is connected through L2 and C3 to RF source 80 by center conductor 68 of cable 66 and moveable electrode 38 is connected through core 40 of solenoid 42 to ground. Intermediate conductor 70 is at ground potential so that conductor 68 and 70 form a conventional coaxial cable. There is approximately a 2/10 of a second delay between the time that cycle-initiating switch 44 is closed until RF power is supplied to electrode 36 as a result of DC power being applied to RF source 80. The RF power which is applied and establishes an RF field between electrodes 36 and 38 which heats the thermoplastic material of tubing 65 and as tubing 65 is melted, the force applied to moveable terminal 38 by solenoid 42 forces the side walls of tube 65 together, welds them together, and decreases the thickness of the material forming weld, or seal, 76 because of the force applied by solenoid 42 until a predetermined minimum distance, or clamping distance, is reached at which time limit switch 48 is closed by the lock screw 52 contacting the switch lever arm 50 of limit switch 48. Normally it takes approximately 1 second for tube 65 to be sufficiently heated and compressed to produce a good seal.

If for any reason the clamping distance or the minimum distance between electrodes 36 and 38 is not reached within a predetermined period of time of approximately 5 seconds, circuit 78 will act as if the limit switch 48 of sealing gun 12 had been closed and thus terminates the application of the DC power to RF source 80. Approximately 2/10 of a second after power to RF source 80 is terminated power to solenoid 42 is cut off. This approximately 2/10 of a second delay permits heat from seal 76 to be dissipated into ambient air to minimize heating of electrodes 36, 38 which minimize the risk of burn through. Tubing 65 is no longer clamped between electrodes 36 and 38 so that the operator can deactivate cycle-initiating switch 44 of sealing gun 12. The controls of system 10 are now reset so that DC power is available at solenoid power terminal 82 and system 10 is in its standby condition, or mode, ready for another sealing cycle. As a result, tubing 65 that has been positioned between electrodes 36 and 38, after a cycle of operation is completed, has been sealed in such a way as to allow separation of the tubing with ends of the tubing on either side of the separation being sealed. The most desirable type of seal is one which after the tubing has been removed from the sealing gun, the segments can be separated with a slight snap or pull being applied to the tubing on either side of the seal where the tubing is to be separated.

In the preferred embodiment, cable 66 is commercially available cable identified as Belden 50 ohm TRIAX (9222). Inner conductor 68 conducts RF and DC control signals. The intermediate conductor 70 shields the RF and serves as a grounds. Outer conductor 72 conducts DC power to solenoid 42.

From the foregoing it is seen that this invention provides a sealing system that has two modes of operation, one in which the sealing gun is hand-held so that the sealing gun can be positioned and controlled by one hand of a user, or operator. In this mode the sealing system is optimized for use in the collection of blood. In the system's fixed mode of operation, the system is optimized for sealing tubing in processing centers. The sophistication of a blood center normally determines the mode of sealer operation. The hand-held sealing gun is sufficiently lightweight so that it can be easily handled using only one hand. By limiting the number of conductors connecting the sealing gun to its housing, physical strain on the operator using the gun is minimized.

By not attempting to control with precision the amount of RF power used in heating the tubing or in directly controlling or determining the time the RF power is applied, this invention uses as its independent variable the distance between the electrodes. As a result, the sealing system of this invention provides a better control over the heating of the thermoplastic material of the tubing being sealed which minimizes the risks of burn through. The hand-held sealing gun of this invention facilitates the sealing of tubes through which blood is collected from the donors in close proximity to the needle through which the blood is withdrawn prior to the needle being withdrawn from the donor's arm.

From the foregoing it should be evident that various modifications can be made to the described invention without departing from the scope of the present invention.

What is claimed is:

1. A sealing system having a cycle of operation, said system during each cycle adapted to hermetically seal a thermoplastic tube comprising:
   tube sealing means adapted to be held in one hand, said tube sealing means having a pair of electrodes which are adapted to be forced together to squeeze the tube between the electrodes and to heat the tube between the electrodes by an RF field established between them, means for sensing when the thickness of the material of the tube between the electrodes has reached a predetermined minimum;
   a first cycle-initiating switch having two conditions, the first condition being a standby condition and the second a cycle-initiating condition, said first cycle-initiation switch adapted to be placed in its cycle-initiating condition by being squeezed by a finger of a hand holding said tube sealing means;
   a housing means containing an electrical power supply, an RF source, and bracket means for removably holding the tube sealing means, said bracket means placing said first initiating switch means of the tube sealing means into its second condition;
   flexible electrical conductor cable means for connecting the tube sealer means to the power supply, to the RF source of the housing means; and
   control means including a mode switch having two conditions and a second cycle-initiating switch having two conditions, a standby condition and a cycle-initiating condition, said mode switch in its first condition enabling the first initiating switch to control the initiation of a sealing cycle and in its second condition enabling the second initiating switch to initiate a cycle of operation.

2. The sealing system of claim 1 in which one of the electrodes is fixed and the other is moveable.

3. The sealing system of claim 2 in which the tube sealing means is provided with energizable means for applying a substantially constant force to move the moveable electrode toward the fixed electrode.

4. The sealing system of claim 3 in which the energizable means is a solenoid.

5. The sealing system of claim 4 in which the flexible electrical conductor cable means includes three concentrically arranged electrically insulated electrical conductors.

6. The sealing system of claim 5 in which the control means in response to an enabled initiating switch being placed in its second condition initiates a cycle of operation of said system.

7. The sealing system of claim 6 in which a cycle of operation comprises energizing the solenoid for a first period of time, after said first period has elapsed while continuing to energize the solenoid, establishing an RF field between the electrodes, terminating the RF field when the thickness of the tube has reached a predetermined minimum, and delaying the de-energization of the solenoid for a predetermined delay period after the RF field is terminated to permit the material of the tube at the seal to cool.

8. A sealing system for hermetically sealing a thermoplastic tube during a cycle of operation of said system comprising:
tube sealing means adapted to be held in one hand and having a pair of electrodes, means for forcing said electrodes together;
circuit means for establishing an RF field between the electrodes to heat the tube placed between the electrodes, and limiting means for limiting the minimum distance between said electrodes, a first initiating switch having two conditions, a first or standby condition and a second, a cycle-initiating condition, said first initiating switch adapted to be placed in its second condition by pressure from a finger of the hand of an operator holding said tube sealing means;
housing means for an electrical power supply and for a source of RF energy, said housing means having bracket means for removably holding the tube sealing means so that the tube to be sealed can be placed between the electrodes of the tube to be sealed can be placed between the electrodes of the tube sealing means;
flexible electrical conductor means for connecting the tube sealing means to the power supply and to the source of RF energy; and
control means for controlling each cycle of operation of said system, said control means including a mode control switch having two conditions and a second initiating switch having two conditions, a first or standby condition and a second, a cycle-initiating condition, said mode control switch in its first condition enabling the first initiating switch to initiate a cycle of operation and in its second condition enabling the second initiating switch to initiate a cycle of operation.

9. The sealing system of claim 8 in which the means for forcing the electrodes together is a solenoid.

10. The sealing system of claim 9 in which the limiting means include a limit switch.

11. The sealing system of claim 10 in which the flexible electrical conductor means has three electrical conductors concentrically arranged.

12. The sealing system of claim 11 in which the control means in response to an enabled initiating switch being placed in its cycle-initiating condition initially energize the solenoid to squeeze together the sides of a tube placed between the electrodes together, a predetermined period of time after the solenoid is energized, establishing an RF field between the electrodes, terminating the RF field when the minimum distance between the electrodes is sensed by the limiting means, or after a predetermined period of time as elapsed after the RF field is established and de-energizing the solenoid after a predetermined period of time has elapsed after the termination of the RF field.

13. A sealing system for hermetically sealing a thermoplastic tube during a cycle of operation of said system, comprising:
a sealing gun having a hand grip, a pair of posts between which a tube to be sealed is placed, one post being fixed and the other moveable;
a solenoid having a moveable core, the moveable post being mounted on said moveable core for movement toward said fixed post;
a trigger switch mounted on the hand grip, said trigger switch when squeezed by a finger of the hand of an operator holding said sealing gun being placed into a condition to initiate a cycle of operation of said system;
a limit switch adapted to be closed when the core of the solenoid has moved the moveable post so that the distance between the two posts has a predetermined minimum value;
a housing, a power supply mounted in said housing;
a source of RF energy mounted in said housing;
control means including a mode switch having two conditions and a cycle-initiating switch, a bracket adapted to removably mount the sealing gun on the housing so that the tube to be sealed can be placed between said pair of posts, said trigger switch of the sealing gun being placed in a condition to initiate a cycle of operation of said system; and
a flexible cable having three conductors for interconnecting the sealing gun, the control means, the power supply and the source of RF energy;
said mode switch in its first condition permitting the trigger switch of the sealing gun to initiate a cycle of operation and when in its second condition permitting the cycle-initiating switch on the housing to initiate a cycle of operation;
a cycle of operation comprising energizing the solenoid for a predetermined first period of time, establishing an RF field between the posts after said first period has elapsed, terminating said RF field when said limit switch closes or after a second predetermined period of time has elapsed whichever occurs first; and
terminating the energization of the solenoid after a predetermined third period of time has elapsed after the termination of the RF field between the posts.

14. A sealing system as defined in claim 13 in which the housing is mounted in a container.

15. A sealing system as defined in claim 14 in which the bracket on the housing is positioned in a space between the housing and the container.

16. A sealing system as defined in claim 15 in which the flexible cable can be coiled up and placed in the space between the housing and the container when the sealing gun is mounted on said bracket.

17. A sealing system as defined in claim 16 in which the container is a carrying case.

* * * * *